May 3, 1927.

G. H. SPENGLER

BORING TOOL

Filed July 5, 1924

1,626,887

Inventor:
George H. Spengler
By Wilson & McKenna
Attys.

Patented May 3, 1927.

1,626,887

UNITED STATES PATENT OFFICE.

GEORGE H. SPENGLER, OF ROCKFORD, ILLINOIS, ASSIGNOR TO FRANK S. VANDER BOGART, OF ROCKFORD, ILLINOIS.

BORING TOOL.

Application filed July 5, 1924. Serial No. 724,279.

This invention relates to boring tools of the kind especially adapted to be used with a hand brace for cutting holes in plates or sheet metal of a diameter larger than made with the ordinary small sized drills, but adapted also to be used with power operated drills.

Heretofore it has been the practice of mechanics, metal-workers plumbers and other artisans, when working without the aid of power drills, to cut such large diameter holes by drilling a series of small holes around a circle, cutting away the center and then finishing the rough edge.

The primary object of the present invention is to provide an improved tool for boring large diameter holes of the character referred to; and to this end I have provided a rotary body having cutting blades secured to one end thereof by a center pin threadedly engaged in the body. By removing the center pin the cutting blades which are preferably in one piece, may be removed and another set of different cutting diameter may be substituted therefor.

I have also aimed to make the center pin in the form of a twist drill so that it will cut a pilot hole and by location therein will serve to guide the cutting blades. Thus the pilot hole and the final hole of larger diameter may be cut successively in what might be termed a single operation.

A further object is provide for very securely fastening the cutting blade to the rotary body as by seating the blade in a diametrical slot in one end of the body and clamping the blade therein by means of a center pin or drill.

Another object is to provide an improved interchangeable cutting blade for boring tools of the character described.

Other objects and attendant advantages will be appreciated as the invention becomes better understood by reference to the following description when considered in connection with the accompanying drawings, in which—

Figure 1:
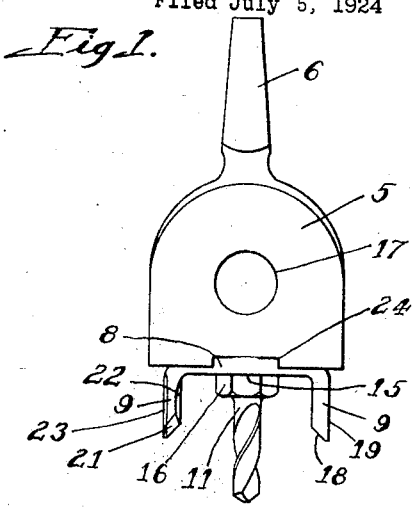
Figure 1 is a side view of a boring tool embodying my invention.
Figure 2:
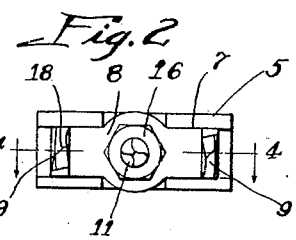
Fig. 2, is an end view of the boring tool looking at the cutter end thereof.
Figure 3:
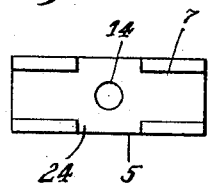
Fig. 3, is a similar end view of the boring tool with the cutting elements removed.
Figure 4:
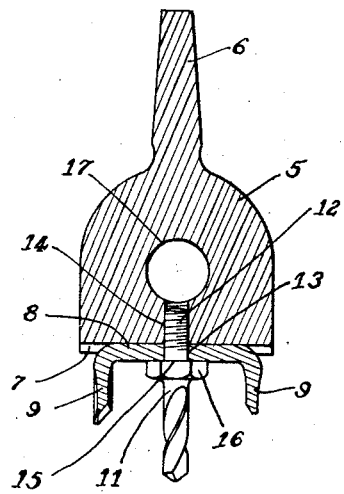
Fig. 4, is a longitudinal section taken on the line 4—4 of Fig. 2.

Referring more particularly to the drawing, it will be observed that the tool body, designated generally by reference character 5, preferably but not necessarily rectangular in cross-section, is shaped at one end to provide a shank 6 adapted to be clamped in a brace, chuck or the like, and at its opposite end to provide a slot or groove 7 extending diametrically of the major axis or axis of rotation of said body. This body of rotation may, however, be of any suitable shape but it is essential to my invention that it shall have a diametrical slot in one end for the reception of a cutter body or element which has diametrically opposed cutting blades.

In the preferred embodiment of my invention this cutter body is a stamping comprising a body portion 8 shaped to fit in the transverse slot 7 and having its ends turned at right angles to provide diametrically opposed cutting blades 9 which extend parallel with the axis of the body 5.

The cutter body 8 is detachably secured to the body proper 5 by means of a center pin 11 which has a threaded end 12 passing through a center hole 13 in the cutter body and being threadedly engaged in a center hole 14 in the body 5, said center pin having a shoulder 15 clamped against the outer face of the cutter body. In the preferred form of my invention the clamping shoulder 15 is the inner face of a nut head 16 formed integral with the center pin. The nut head facilitates tightening the latter in the rotary body. It will thus be apparent that when the center pin is tightened in position the cutter body will be securely clamped in the transverse slot in the rotary body and confined by the side walls thereof against rotary displacement and by the center pin against displacement endwise of the slot. The slot 7 extends entirely across the end of the body 5 so that cutter bodies of different sizes, that is, for cutting holes of different diameters, may be used in the same manner as shown. In the present case the body 5 has a transverse hole 17 which intersects the hole 14 merely to facilitate tapping the latter.

In the prefered embodiment of my invention the center pin is in the form of a twist drill as shown so that the center or pilot hole will be drilled by the same tool which cuts the larger hole, the drill serving as a pilot for the cutter blades 9. These cutter blades it will be noted are shaped to provide end and side cutting edges 18 and 19 respectively, with suitable end clearance faces 21 and inner and outer clearance faces 22 and 23 respectively, these faces being ground after the ends of the cutter blank have been turned up. In the present case the medial portion of the cutter body is wider than the end portions which are seated in the slot 7 so as not to weaken the cross-sectional area due to the metal removed by the center hole 13. In such case the medial portion of the walls defining the slot 7 is cut away at 24 for reception of the enlarged portion of the cutter body.

It is believed that the mode of operation of the tool is obvious. In the event that a plain center pin is used it will be necessary to drill a center pilot hole with another drill for the reception of the center pin. The use, however, of a twist drill for the center pin is very desirable because it expedites the drilling and boring operation and combines into one tool the operations which previously had been performed with several tools. It will be noted that the cutter body is very firmly clamped to the rotary body so as not to easily loosen or be displaced during operation.

It is believed that the foregoing conveys a clear understanding of the principles and objects of my invention and while I have illustrated but a single working embodiment it should be understood that changes might be made in details of construction without departing from the spirit and scope of the invention as expressed in the appended claim, in which—

I claim:

A boring tool comprising a rotary body having a shank at one end, a threaded hole at its opposite end coaxial with the shank, a transverse slot in said opposite end extending diametrically of said hole, a cutter body removably fitting in said slot and having at each side of said hole a cutter blade extending parallel with the axis of rotation of the body proper, and a center pin threadedly engaged in said hole and clamping the cutter body to said body proper.

GEORGE H. SPENGLER.